United States Patent
Tchoukaleysky (10) Patent No.: US 9,143,758 B2
(45) Date of Patent: Sep. 22, 2015

(54) METHOD AND APPARATUS FOR LOW-BANDWIDTH CONTENT-PRESERVING ENCODING OF STEREOSCOPIC 3D IMAGES

(75) Inventor: Emil Tchoukaleysky, Toronto (CA)

(73) Assignee: THOMSON LICENSING, Issy les Moulineaux (FR)

( * ) Notice: Subject to any disclaimer, the term of this patent is extended or adjusted under 35 U.S.C. 154(b) by 504 days.

(21) Appl. No.: 13/635,169

(22) PCT Filed: Mar. 22, 2010

(86) PCT No.: PCT/IB2010/000635
§ 371 (c)(1),
(2), (4) Date: Sep. 14, 2012

(87) PCT Pub. No.: WO2011/117662
PCT Pub. Date: Sep. 29, 2011

(65) Prior Publication Data
US 2013/0016898 A1  Jan. 17, 2013

(51) Int. Cl.
*G06K 9/00* (2006.01)
*H04N 13/00* (2006.01)
*H04N 19/597* (2014.01)
*H04N 19/105* (2014.01)
*H04N 19/46* (2014.01)
*H04N 19/169* (2014.01)
(Continued)

(52) U.S. Cl.
CPC ......... *H04N 13/0066* (2013.01); *H04N 19/105* (2014.11); *H04N 19/137* (2014.11); *H04N 19/169* (2014.11); *H04N 19/194* (2014.11); *H04N 19/46* (2014.11); *H04N 19/597* (2014.11)

(58) Field of Classification Search
CPC ............ H04N 13/0066; H04N 19/597; H04N 19/105; H04N 19/194; H04N 19/169; H04N 19/137; H04N 19/46
See application file for complete search history.

(56) References Cited

U.S. PATENT DOCUMENTS 5,696,551 A   12/1997   Katto
6,144,701 A   11/2000   Chiang et al.

FOREIGN PATENT DOCUMENTS

| | | |
|---|---|---|
| EP | 2046047 | 4/2009 |
| JP | 1202093 | 8/1989 |
| JP | 6189291 | 7/1994 |

(Continued)

OTHER PUBLICATIONS

Ohm et al. "A realtime hardware system for stereoscopic videoconferencing with viewpoint adaptation", Nov. 6, 1998, Signal Processing: Image Communication, vol. 14, iss. 1-2, p. 147-171.*

(Continued)

*Primary Examiner* — Stephen R Koziol
*Assistant Examiner* — Timothy Choi
(74) *Attorney, Agent, or Firm* — Robert D. Shedd; Catherine A. Cooper (57) ABSTRACT

A method and apparatus are described including accepting a first and a second stereoscopic eye frame line image, determining a coarse image shift between the first stereoscopic eye frame line image and the second stereoscopic eye frame line image, determining a fine image shift responsive to the coarse image shift, forwarding one of the first stereoscopic eye frame line image and the second stereoscopic eye frame line image and forwarding data corresponding to the fine image shift and metadata for further processing.

23 Claims, 7 Drawing Sheets

(51) Int. Cl.
*H04N 19/137* (2014.01)
*H04N 19/194* (2014.01)

(56) References Cited

FOREIGN PATENT DOCUMENTS

| JP | 7162864 | 6/1995 |
|---|---|---|
| JP | 9093614 | 4/1997 |
| JP | 2000333184 | 11/2000 |
| JP | 2001502504 | 2/2001 |
| WO | WO2009034486 | 3/2009 |

OTHER PUBLICATIONS

Alfonso, Alba et al., "Phase-Correlation Guided Search for Realtime Stereo Vision", Combinatorial Image Analysis, Berlin, Nov. 24, 2009, pp. 212-223.

Jiang et al., "Disparity Estimation and Compression in Multi-View Video Plus Disparity Maps", Joint Video Team of ISOI/IEC JTC1/SC29/WG11 and ITU-T SG 16, No. JVT-Y024, Oct. 20, 2007.

Lucas, B. D. et al.,"An lierative Image Registration Technique with an Application to Stereo Vision", International Conference on Artificial intelligence, Aug. 24, 1981, pp. 674-679.

Yuichi Ohta et al., "Stereo by Intra-and Inter-Scanline Search Using Dynamic Programming", IEEE Transactions on Pattern Analysis and Machine Intelligence, vol. 30, No. 2, Mar. 2005, p. 139.

Scharstein et al., "A Taxonomy and Evaluation of Dense Two-Frame Stereo Correspondence Algorithms", Stereo and Multi-Baseline Vision, 2001, Dec. 9, 2001, pp. 131-140.

Sethuraman et al., "A Multiresolution Framework for Stereoscopic Image Sequence Compression", Proceedings of the International Conference on Image Processing (ICIP), vol. 2, Austin, Nov. 13-16, pp. 361-365.

Zhang et al., "An Efficient Hierarchical Disparity Estimation Algorithm for Stereoscopic Video Coding", Circuits and Systems, 2000, Dec. 4, 2000, pp. 744-747.

International Search Report for PCT/IB2010/000635 dated Sep. 21, 2010.

* cited by examiner

Fig 1.

Fig 2. a) Initial position of the LE and RE image lines, and the difference LE - RE
b) RE image line shifted to the right, for the far objects in the scene, and the difference LE - RE
c) RE image line shifted to the right, for the middle-depth objects in the scene, and the difference LE - RE
d) RE image line shifted to the right, for the closest objects in the scene, and the difference LE - RE

METHOD AND APPARATUS FOR LOW-BANDWIDTH CONTENT-PRESERVING ENCODING OF STEREOSCOPIC 3D IMAGES

This application claims the benefit, under 35 U.S.C. §365 of International Application PCT/IB2010/000635, filed Mar. 22, 2010, which was published in accordance with PCT Article 21(2) on 29 Sep. 2011 in English.

FIELD OF THE INVENTION

The present invention relates to the delivery of three dimensional (3D) video images and, in particular, to a method and apparatus to reduce the bandwidth required for the delivery of 3D video images while preserving the content.

BACKGROUND OF THE INVENTION

In multicast or broadcast applications, data are transmitted from a server to multiple receivers over wired and/or wireless networks. A multicast system is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

While the existing methods for delivering (transmitting, deploying) the left eye (LE)-right eye (RE) image difference as an additional layer achieve substantial stereoscopic compression, the bandwidth for the additional layer ranges from 30% to 60% of a single channel. This amount is still high and presents a problem for distribution, decoding, and storage.

An object is to find a practical and efficient method, which will deliver the additional layer in the image of 15% to 30% of the bandwidth of a single video stream.

The present compression method is better adapted to the stereoscopic 3D (S3D) structure of the LE and RE video image pair and exploits the intrinsic relation of the two picture channels. If the original S3D picture was captured using parallel camera rig or toe-in, or if it was captured (shot) applying creative scene depth, the two images in the pair have a deeper correlation, which could be extracted by non-linear rotation along the z-axis (or depth axis) of the images. The present invention uses this correlative feature, which comes from the particularities of the Human Visual System (HVS), and delivers better video transport compression.

SUMMARY OF THE INVENTION

The present invention permits advanced deployment to the home of video images (pictures), captured or created with the purpose of image depth reproduction. One of the Left Eye (LE) image and Right Eye (RE) image is wholly transported over the existing pipelines (links, channels) whether those links are multicast, broadcast, cable, satellite, interne, terrestrial, etc. The second video image is compressed using the volumetric features and spatial particularities of the stereoscopic picture pair.

The present invention extends the solutions, listed as part of MPEG 4 implementations, known as 2D Plus Delta technology. The present invention described herein differs from this technology with regard to correlating the LE and RE images, based on 3D rotation and iterative image subtraction.

It should be noted that video image data is used as an example but the data could also be S3D type multimedia data. It should be noted that the present invention can be used in systems where the 3D video images are displayed on a TV or rendered on a display monitor or a video projector or any other device capable of rendering 3D video images including but not limited to mobile devices, computers, laptops, notebook computers, personal digital assistants (PDAs), dual mode smart phones etc. The term TV line is used herein as an exemplary embodiment of the above systems to deliver and render 3D video images. Any of the above devices may operate in a client-server architecture or a peer-to-peer (P2P) architecture or any combination thereof or any other architecture used to deliver and render 3D video images. Combination architectures include, for example, a P2P architecture used in a multi-hop wireless relay network that has mesh routers that are connected to a server in a client-server architecture.

The present invention employs efficient stereoscopic image encoding by initially subtracting the RE image of the first active frame line in the display frame from the LE image of the first active frame line (the same line). If the difference is substantial, the algorithm recognizes that there is stereoscopic content and begins to locate where it is concentrated—in the far zone, in the middle zone, or in the closer to the viewer zone of the real scene. This is achieved by shifting the RE image line in direction of the LE image line, in three steps, and producing three LE-RE differences. A minimal difference indicates the dominant image depth of the scene. A finer image line shift is then determined around this position for less difference. For the next TV lines the process is repeated, with added vertical line correlation in one frame, and inter-frame temporal line correlation. The process thus finds the closest position of RE image to the LE image. The non-linear RE image line shifting represents a rotational operation in the TV frame, aiming to adapt to the LE image line in the most pronounced stereoscopic plane. The LE image is fully delivered, while the RE image is delivered by encoding the RE image as the smallest LE-RE difference. Calculations are: shift, subtract, and count the accumulated bytes in the difference. The compression method operates in the real time of the line scanning. On the receiving side, the decompression method accepts (receives) metadata with line shift values and the method subtracts the LE-RE difference from the transmitted full LE image to restore RE line image, and position the RE line image to its original position.

It should be noted that the method of the present invention processes full progressive scanning or interlaced LE and RE images. That is, the method of the present invention processes the images in the manner in which they are presented to the method and apparatus of the present invention. The present invention does not modify the raster format nor employ zonal or interleave compression. It carries information for both images in parallel and does not employ any LE or RE image sequences to compress the stereoscopic image pair.

It should be noted that the exemplary embodiment described herein subtracting the RE image from the left eye image could be reversed. If such is the case then the method of the present invention would be reversed as well. It should also be noted that the method of the present invention could also use more regions than a close region, a middle region and a far region. For example, another region could be between the close region and the middle region and between the middle region and the far region, thus, making five regions and five shifts and five subtractions. That is, the present invention is not limited to three regions but the use of three regions is used as an exemplary embodiment.

The method and apparatus of the present invention are designed to reduce the bandwidth of the S3D dual video stream, delivered to the home or theatre or mobile device, by employing adaptive technology to the stereoscopic image pair. There are three categories of advanced S3D video encoders and methods, to which the present invention could be compared:

1) Methods for standard 2D Plus Delta encoding. These methods are based on an H.264 implementation of Multi-view Video Coding extension of MPEG 4, and are listed at ISO/ITU/IEC/MPEG2/MPEG4/MVC initiatives. This technology utilizes one of the LE or RE channel as a two-dimensional (2D) version, while the compressed difference, or disparity (Delta), between that channel and the second channel is injected into the video stream's user data, or is delivered as a secondary stream, or as an enhanced layer. The Delta data could be spatial stereo disparity, temporal prediction, or bidirectional motion compensation but the delta data is not image depth data.

The advantage of this category of methods is that they allow for the reconstruction of the full information of the LE and RE stereoscopic video views, can be delivered over existing pipelines, and can be decoded by legacy 2D decoders. The disadvantage of the approach is that it doesn't utilize the natural correlation of the LE and RE images and thus the compression efficiency is limited.

2) Methods for 2D Plus Depth encoding, also called 2D Plus Z format. These methods are based on grayscale depth map, built associated with each 2D image frame. The map indicates if a specific pixel in the 2D image needs to be reproduced in front of the display (screen) plane, or behind the same plane. The 256 grayscale levels can build a smooth gradient of depth within the image. Processing in the display monitor (the TV set, the video project, mobile device or any other display device used to render S3D video images) takes the depth map and reconstructs the LE and RE video images, and also renders multi-view images.

The advantage of this category of methods is in the limited bandwidth, which falls within the range of 20% of a video channel for delivering a single video (non-S3D) video stream. The disadvantages of this category of methods lies in its incompatibility with existing 2D displays, the difficulty to accurately generate a depth map from a live stereoscopic feed, and the visible artifacts while rendering the depth map.

3) Methods for image segmentation and stereoscopic correlation calculations. These methods find their application in computer vision and edge detection of complex scenes, and have brought progress and advantages in 3D pictorial presentation and recognition. Their disadvantage is the higher cost and slow processing, which is not always acceptable in live broadcasting (multicasting, streaming).

The method of the present invention, thus, represents the second video stream with 15% to 30% of a full channel bandwidth that would have been required to deliver the entire second video stream. The resulting compressed video stream contains all information necessary to reconstruct the LE and RE stereoscopic views in full resolution.

A method and apparatus are described including accepting a first stereoscopic eye frame line image, accepting a second stereoscopic eye frame line image, determining a coarse image, shift between the first stereoscopic eye frame line image and the second stereoscopic eye frame line image, determining a fine image shift responsive to, the coarse image shift, forwarding one of the first stereoscopic eye frame line image and the second stereoscopic eye frame line image and forwarding data corresponding to the fine image shift and metadata for further processing. Also described are a method and apparatus including receiving a transmitted first full stereoscopic eye frame line image, extracting a difference between a first stereoscopic eye frame line image and a second stereoscopic image, subtracting the extracted difference from the first stereoscopic eye frame line image, storing the second stereoscopic eye frame line image, extracting a shift line value from metadata included in the first full stereoscopic eye frame line image and shifting the second stereoscopic eye frame line image to its original position responsive to the shift value.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

There have been several approaches to the problem of compressing the two video channels of a stereoscopic 3D image as much as possible into a single video channel for distribution via broadcast, satellite, cable, internet, packaged media, blu-ray disc, and recently—via mobile. With the revival of S3D, new technologies were created, or some existing standards and practices were applied to volumetric pictures for the purpose of compressing and compatibility with the current pipelines. The difficulties come from the fact that the second video stream may, still require independent channel for delivery, if quality compressed images cannot be embedded into the first stream.

Significant progress has been achieved by using the MPEG initiatives for stereoscopic video compression and content delivery, mainly under the 2D Plus Delta methodology. An objective of the present invention is to utilize the correlative features of the stereoscopic image pair in the development of the next level of content-preserving compression, which would result in closer to a single channel representation of the pair.

One feature of the S3D imaging is the rotational similarity of the LE image and the RE image. The objects closest to one's eyes have the largest image disparity, e.g. the difference between the spatial LE and RE images is the greatest—not only in terms of position but also of content. The far objects, usually at more that 150 feet away, appear to generate similar images in the HVS for the LE and RE. The objects in between the close and far areas create an intermediately different stereoscopic image pair—in terms of spatial position and content. If image rotation is applied to one of the LE or RE images, with the center of rotation being the far plane, and if the direction of the rotation: is towards the other image, then at a certain angle of spatial rotation the images will overlap. At this instant only the content difference between the images of the stereoscopic pair will be pronounced. This remaining difference comes from the inter-ocular distance of HVS, and presents the highest valuable information for encoding.

Practically, it is hard to perform spatial rotation on already acquired S3D images. The present invention, though, looks at the possibility of obtaining similar results by iterative mathematical operations on the two lines of images in the pair. Thus, several steps have been researched:

finding the coarse rotational correlation between the LE image and the RE image, one frame line at a time finding the fine rotational correlation between the LE image and the RE image, one frame line at a time correlating the consecutive frame lines in one S3D frame, in the vertical direction correlating the consecutive frames, in temporal direction.

Figure 1:
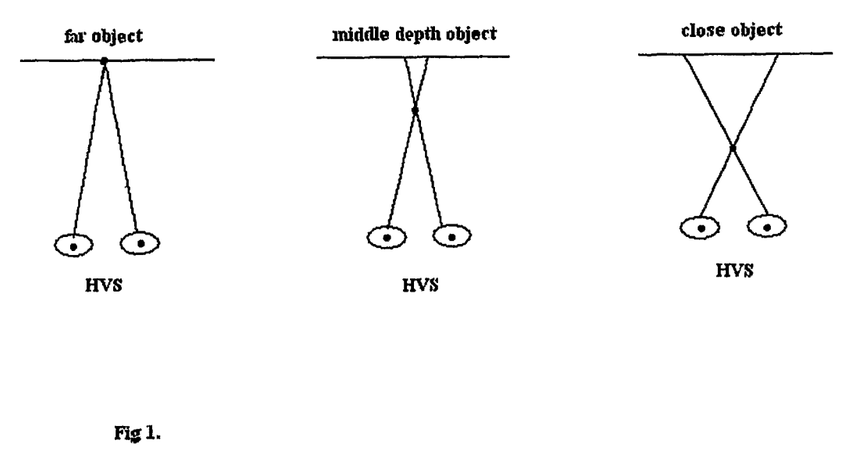
FIG. 1 depicts the position of a scene object relative to the Human Visual System (HVS).

The positions of the scene object relative to the viewer are depicted in FIG. 1 as far object, middle depth object, and close object. This presentation is a fundamental basis to the understanding of the invention and the selection of the object's prevailing position for RE image encoding.

Figure 2:
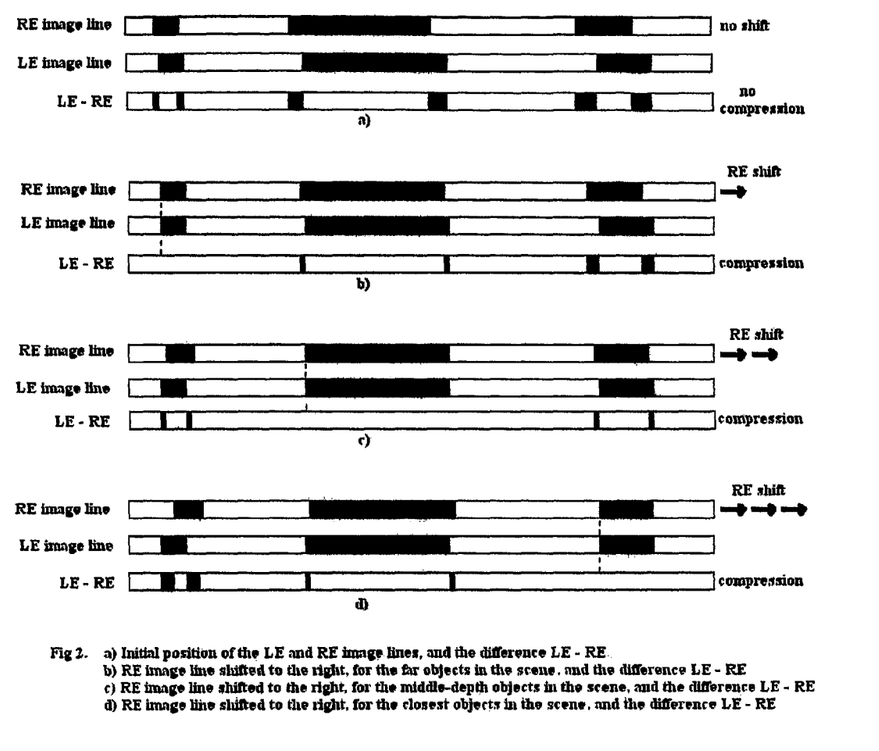
FIGS. 2a, 2b, 2c and 2d show the initial LE and RE line images and the results of shifting the RE image right in order to determine the coarse differences for far scene objects, middle scene objects and close scene objects.

FIG. 2a is an example showing pixels of line-objects from the LE and RE images in the top two lines. The horizontal positional difference is the initial image disparity, as acquired by the two cameras of the stereoscopic camera rig. The LE image is positioned to the right of the RE image: That is also how humans see the images, assuming both pictures start from one and the same horizontal starting, point—the zero pixel number for both.

In one embodiment of the present invention the LE image line is taken as a reference and the RE image line is moved, or shifted, horizontally to the right, in the direction of the LE image line, to find the least (minimal) LE–RE difference. The bottom (last) line of FIG. 2a shows the initial LE–RE image difference before any compression is initiated. This difference is less in bit size than either of the two stereoscopic components but is greater than the same difference when created after the RE image shifts as described below.

The RE image shift is performed in four phases:

Initially subtract the RE image from the LE image (LE–RE) and analyze the results. If the result is between zero and 128 bytes, the two image lines are not different, and there is no substantial S3D information in this frame line. The subtraction phase is implemented by subtracting one after the other of the video values of all same-number pixels LE–RE and then add the differences. If the subtraction (difference) result is greater than the digital value of 128 bytes, there is significant S3D data in the frame line. The subtraction process adds the difference result to the following calculation bytes, until the 128th byte gets filled up. There is no need to precisely calculate the difference. The number of the last full byte after the consecutive subtractions and additions gives enough information to judge the stereoscopic effect and the last full byte is denoted herein as Diff(initial), for Difference Initial.

The first horizontal shift of the RE image is by a small pixel number, and shifts the RE image line to the right. It is shown in FIG. 2b. It is related to objects that are deep, or far, in the real S3D scene. All pixels of the RE image line are being shifted to the right by 10 pixels and is denoted herein as Shift(far). A buffer larger than the length of the frame line is needed to accommodate the right-most pixels of the RE image line. Subtract the 10-pixel-moved RE image-line from the LE image-line and retain (store, keep) the result, which is the number of last full byte after the calculations. Then, reset the RE image-line position to its initial place. The bottom (last) line of FIG. 2b shows significant reduction of the bit size of the image difference compared to the bottom (last) line of FIG. 2a.

The second horizontal shift of the RE image line is by 50 pixels to the right. It is shown in FIG. 2c and is denoted herein as Shift(middle). It is related to objects in the middle depth of the real S3D scene. All RE image line pixels get shifted to the right and another buffer is employed for storing the shifted frame line. Subtract the 50-pixel-moved RE image line from the LE image line and retain (store, keep) the result, which is the number of the last full byte after the calculations. Then, reset the RE image line position to its initial place. The bottom (last) line of FIG. 2c also shows a reduction of the bit size of the image difference compared to the bottom (last) line of FIG. 2a.

The third horizontal shift of the RE image line is by 150 pixels to the right. It is shown in FIG. 2d and is denoted herein Shift(close). This shift will address the objects closest to the viewer in the real S3D scene. All RE image line pixels are shifted and another extended buffer is involved in order to store the shifted frame line. Subtract the 150-pixel-moved RE image line from the LE image line and retain (store, keep) the result, which is the number of the last full byte after the calculations. Reset again the RE image line position to its initial place. The bottom (last) line of FIG. 2d also shows a reduction of the bit size of the image difference compared to the bottom (last) line of FIG. 2a.

Once the three image line shifting and subtraction phases are implemented, compare the resulting differences to the Diff(initial). It is only necessary to compare the number of the last full byte. Whichever of the three shift results has the smallest last full byte number compared to Diff(initial) is the best RE image line approximation of the LE image line and is denoted herein as RE(coarse). It reflects the predominant object position for this frame line along the Z-axis of the scene. RE(coarse) is then subtracted from LE image line, pixel by pixel, and the video difference is the initial result of the compression. It represents the second video channel in the image pair with minimal redundancy and is denoted herein as the coarse difference (Diff(coarse)).

Of the examples shown in FIGS. 2a, 2b, 2c and 2d, the shift of FIG. 2c has the best resulting LE–RE image difference and is selected by the method of the present invention for the next step of the compression method of the present invention, which is the fine correlation between the two image lines. The metadata carries the RE line shift information in two bytes per line.

After the coarse rotational correlation between the LE and RE image lines, finds the best initial matching, the next level of correlation search is initiated—to find smaller (lesser) LE–RE difference in the area (surroundings, vicinity) of the coarse rotational correlation. The process applies similar pixel shifts, subtractions, and last-full-byte comparisons.

To begin the search for the fine rotational correlation, set the RE image line at its best position, determined in the coarse rotational correlation as described above, RE(coarse). Next shift (move) the RE image line in smaller increments, initially to the right, by, for example, five pixels. Subtract each shifted RE image line from the LE image line and compare its last full byte number to the Diff(coarse) last full byte number. If the new byte number is smaller than the Diff (coarse), the algorithm has found a better RE image line candidate for the encoder and it is denoted herein RE(fine), and the fine difference is denoted herein Diff(fine). Repeat the shifting of the RE to the right, until the Diff(fine) begins to increase (grow) and select the smallest Diff(fine).

If the Diff(fine) is larger than Diff(coarse), then shift the RE image line back to the left, in five pixel increments. If a new byte number is found smaller than Diff(coarse), this will be a better candidate for encoding. Repeat the shifting of the RE to the left until the Diff(fine) begins to increase (grow) and select the smallest Diff(fine). Store the RE image line pixel position in the metadata of the buffer for delivering the RE image line data.

Every other frame line of the video frame has to undergo the processing the first frame line did as described above, while noting the additional non-linear correlation assessment of the consecutive frame lines. Based on the known structure and statistics of the video imaging, the best approximation for the next frame line shift would be the RE(fine) position from the previous line so that is a good starting point to locate the coarse rotational correlation point (position) of the next frame line.

Following this consideration, the next line Diff(initial) difference is tested. If the result is similar to its value from the previous frame line, the rotational correlation between the frame lines saves the remaining calculations. If the Diff(initial) differs by |20|% of its value from the previous line, then the objects show dissimilarity in the vertical direction of the image, and the calculations described above are to be repeated (conducted anew).

Every next frame of the image sequence is to undergo the processing described above, with the addition of the interframe non-linear rotational correlation. Video frames carry redundant information, and also repetition of object sizes and positions.

Given this consideration, the next line LE–RE(fine) difference is, tested. If the result is similar to its value from the previous frame, the correlation between the frames saves the detailed calculations. If the Diff(fine) is different by |20|% of its value from the previous frame, then the objects show dissimilarity in the temporal direction of the image, and the calculations described above are repeated (to be conducted anew).

The S3D compression method transforms one frame in less time than the duration of the frame period and is this considered to be a real time calculation. The associated metadata carries the pixel offset for the RE image, two bytes per frame line. The shifted, or rotated RE channel, is presented by the LE–RE difference, taken at the best overlapping position of the two images in the stereoscopic pair. The rotational transformation, or sequential RE image shifting, is performed line by line, thus detecting the scene convergence in a number of steps.

The receiving side has fewer calculations and it subtracts the transmitted LE–RE image difference from the full LE image to reconstruct the RE image and then the RE image is shifted back to its original position. The information for the shift value is taken from the metadata.

The flowchart of an exemplary embodiment of the compression method of the present invention is shown in two figures due to its large size.

Figure 3:
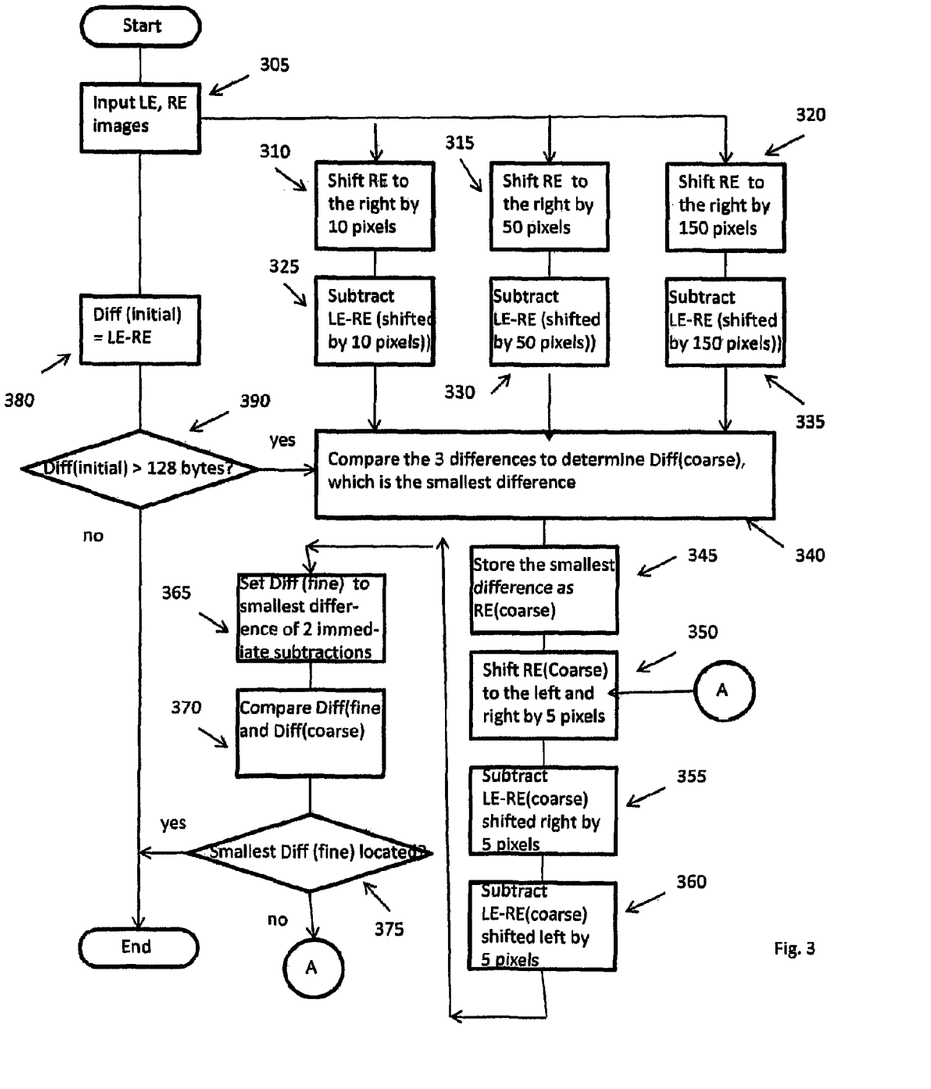
FIG. 3 is a flowchart of an exemplary embodiment for determining the coarse image shift for the compression method of the present invention.

FIG. 3 depicts an exemplary embodiment of the one frame line compression method of the present invention, where the input LE and RE image lines are initially subtracted to produce Diff(initial). If the result is bigger that 128 bytes, the method continues. Then, the RE image line is shifted to the right by 10, 50, and 150 pixels each and the results are subtracted from LE image line. The three differences are compared and the Diff(coarse) is assigned to smallest among the three. The RE image line is then shifted to the right and to the left by 5 pixels in the next module. Its value is subtracted from LE image line at each step and Diff(fine) is created. Both Diff(coarse) and Diff(fine) are compared and the process loops until the smallest difference is found.

Figure 4:
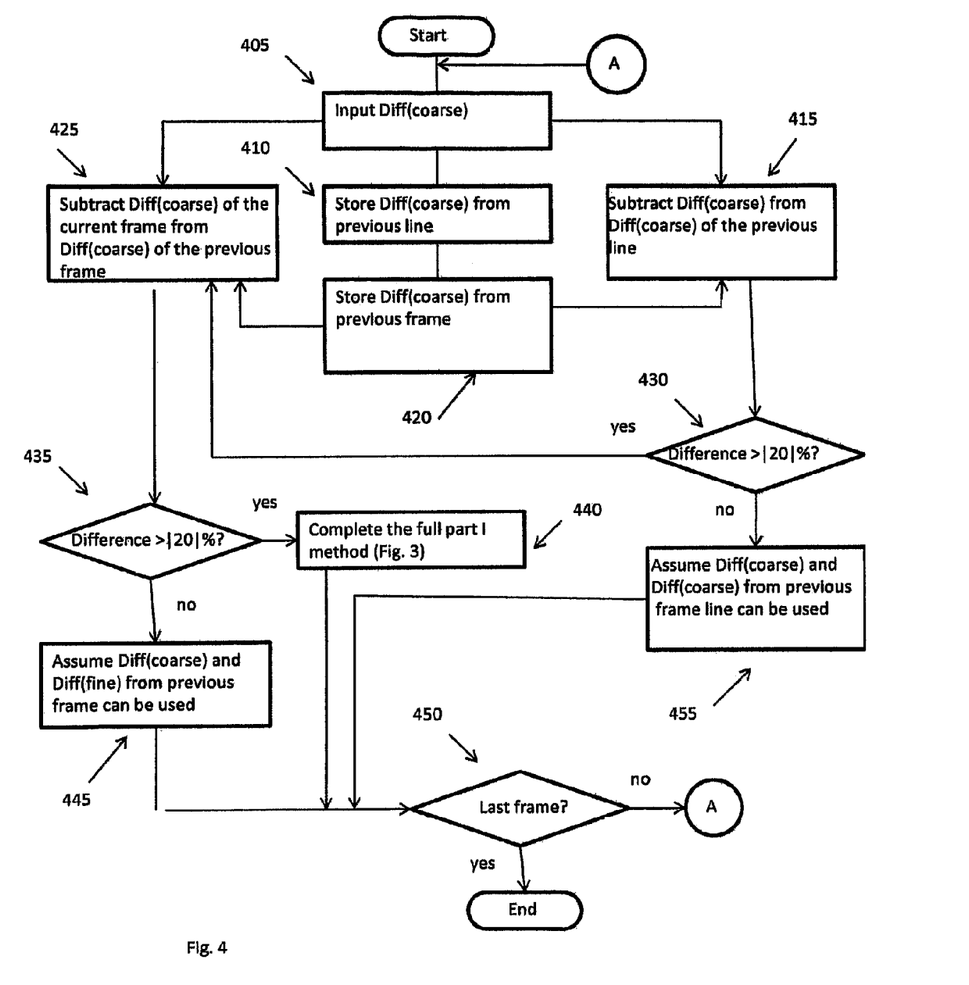
FIG. 4 is a flowchart of an exemplary embodiment for determining the inter-line and inter-frame processing for the compression method of the present invention.

FIG. 4 shows the second part of an exemplary embodiment of the compression method of the present invention, where the Diff(coarse) from part 1 (shown in FIG. 3) of the method is the input. The Diff(coarse) from previous frame line and from the previous frame are also input and stored. The comparison of current. Diff(coarse) to Diff(coarse) from the previous line will determine if the previous line shift value can be used. If the difference between Diff(coarse) current line and Diff(coarse) previous line is >|20|% then the full algorithm, part 1, is executed. If not, the comparison to the Diff(coarse) from the previous frame will be involved for the same comparison, when its difference is <|20|%.

Figure 5:
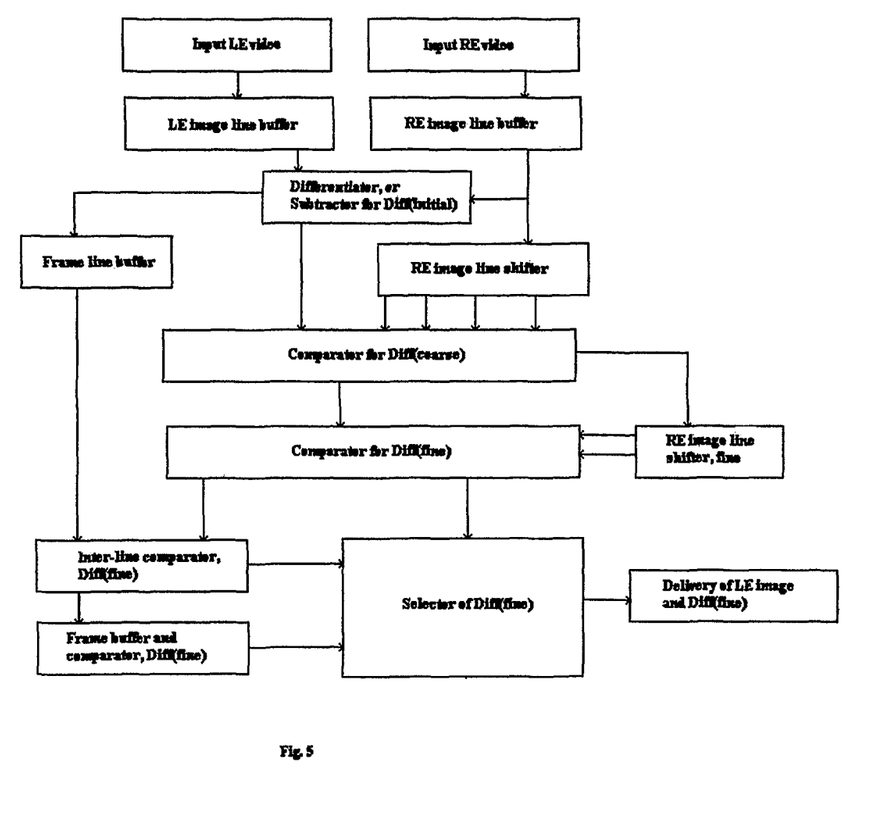
FIG. 5 is a block diagram of an exemplary embodiment of an encoder in accordance with the principles of the present invention.

FIG. 5 is a block diagram of an exemplary embodiment of the compression apparatus of the present invention. The LE and RE image line buffers used to store LE and RE image data respectively and are connected to a differentiator and its output is Diff(initial). Through a RE image line shifter (coarse) the offset RE image lines are supplied to a comparator, where the Diff(coarse) is calculated. Via a fine RE image line shifter and another comparator, the Diff(fine) is generated. A selector chooses the smallest Diff(fine) between the current, previous frame line, and previous frame, and the result is the compressed second video stream, which is delivered for further MPEG processing. The Diff(initial) output from the differentiator is supplied to a frame line buffer. The frame line buffer data is supplied to an inter-line comparator to determine the Diff(fine) by comparison between the current line Diff(fine) and the previous line Diff(fine). The output of the inter-line comparator supplies information to the selector and to the frame buffer and comparator, which determines the Diff(fine) by comparison between the current line Diff(fine) and the previous frame Diff(fine). Output of the frame line comparator is supplied to the selector.

Figure 6:
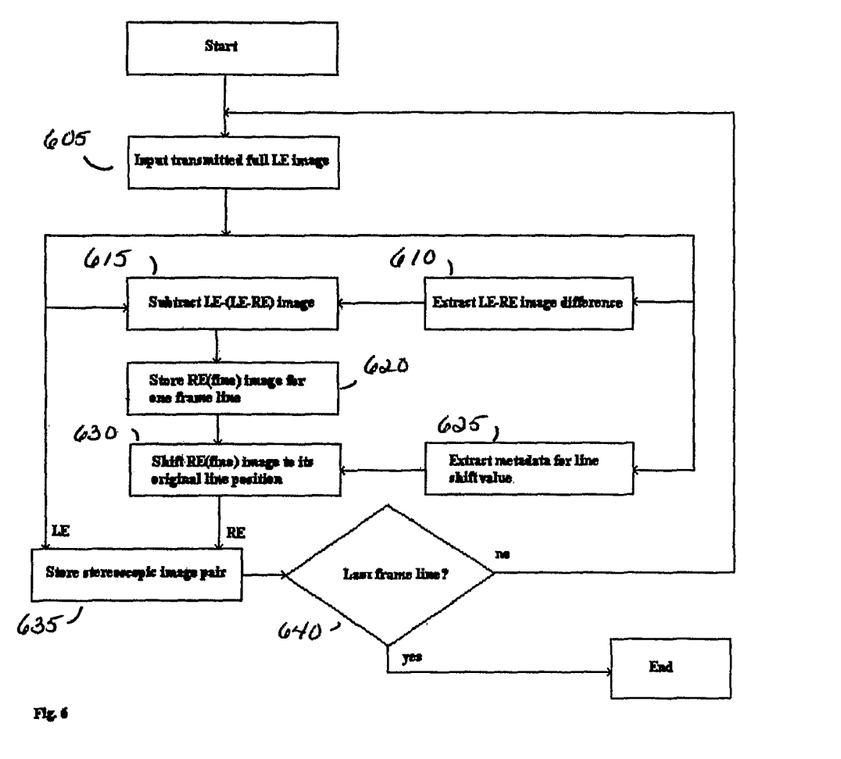
FIG. 6 is a flowchart of an exemplary embodiment of the decompression method of the present invention.

An exemplary embodiment of the decompression method of the present invention is depicted in FIG. 6. The received full (non-compressed) LE image is used first to extract from it the (LE–RE) image difference. This low-bandwidth image difference was compressed by the compression of the present invention, which allowed the compressed image difference to be embedded in the stream of the main LE image. Then the subtraction LE–(LE–RE)=RE delivers the shifted RE(fine) image line. The latter is stored and shifted to its original position in the frame line, in accordance with the control information from the metadata. The stereoscopic pair is thus restored.

Figure 7:
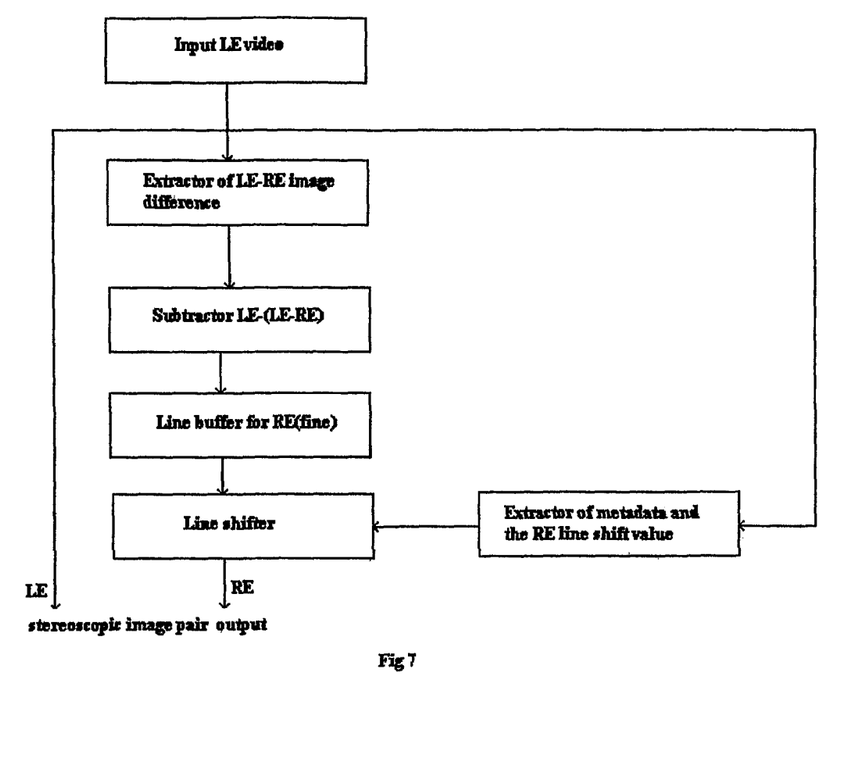
FIG. 7 is a block diagram of an exemplary embodiment of a decompressor of the present invention.

FIG. 7 is a block diagram of an exemplary embodiment of the decompression apparatus. The input LE image video signal is supplied to extractor of LE–RE image difference, which takes a small part of the main stream. Then the subtractor for LE–(LE–RE) restores the RE(fine) image. The latter is buffered and shifted to its original position in the frame line, in accordance with control information from the metadata module. The output of the apparatus is the stereoscopic pair of LE and RE images.

Referring again to FIG. 3, at 305 the RE and LE images are input. At 310 the RE image is shifted to the right by 10 pixels. At 325 the RE image shifted by 10 pixels is subtracted from the LE image. At 315 the RE image is shifted to the right by 50 pixels. At 330 the RE image shifted by 50 pixels is subtracted from the LE image. At 320 the RE image is shifted to the right by 150 pixels. At 335 the RE image shifted by 150 pixels is subtracted from the LE image. At 340 the three differences (10, 50 and 150 pixels) are compared to determine the smallest difference. Diff (coarse) is set to the smallest difference. At 345 RE(coarse) is set to the smallest difference (Diff(coarse)). At 350 RE(coarse) is shifted both left and right by 5 pixels. At 355 RE(coarse) shifted right by 5 pixels is subtracted from LE. At 360 RE(coarse) shifted left by 5 pixels is subtracted from LE. At 365 Diff(fine) is, set to the smallest of the two immediately previous subtractions. At 370 Diff (fine) is compared to Diff(coarse). At 375 a test is performed to determine if the smallest Diff(fine) has been located (found). If the smallest Diff(fine) has been located (found) then processing ends for this portion of the method of the present invention and processing proceeds to FIG. 4. If the smallest Diff(fine) has not been located (found) then processing proceeds to 350. At 380 Diff(initial) is set to LE−RE. At 390 a test is performed to determine if Diff(initial) is greater than 128 bytes. If Diff(initial) is greater than 128 bytes then processing proceeds to 340. If Diff(initial) is greater than 128 bytes then processing ends.

Referring again to FIG. 4, the Diff(coarse) from part 1 (shown in FIG. 3) of the method is the input at 405. At 410 Diff(coarse) from previous frame line is stored and at 420 Diff(coarse) from the previous frame is stored. At 415 Diff (coarse) from this line is subtracted from Diff(coarse) of the previous line. At 430 a test is performed to determine if the difference is greater than |20|%. If the difference is less than or equal to |20|% then it is assumed at 455 that Diff(coarse) from the previous frame line can be used. A test is performed at 450 to determine if this is the last frame. If this is the last frame then processing ends. If this is not the last frame then processing proceeds to 405. If the difference is greater than |20|% then processing proceeds to 425. After Diff(coarse) from the previous frame is stored then processing proceeds to 425. At 425 Diff(coarse) from the current frame is subtracted from Diff(coarse) of the previous frame. That is, the positive result at 430 acts as a trigger or control line without which the processing at 425 and subsequently will not be executed. A test is performed at 435 to determine if the difference is greater than |20|%. If the difference is greater than |20|% then go back and execute the steps of FIG. 3 at 440. Processing proceeds to 450. If the difference is less than or equal to |20|% then it is assumed that Diff(coarse) from the previous frame can be used at 445. Processing proceeds to 450.

Referring again to FIG. 6, at 605 the LE image line is input. The LE image line includes the full LE image and the LE−RE image and the metadata. At 610 the LE−RE image difference is extracted. At 615 the LE−RE image difference is subtracted from the LE image. At 620 the RE(fine) image is stored for one frame line. At 625 the metadata is extracted from the input LE image line. At 630 the RE(fine) image is shifted to its original line position using the metadata. That is, the RE image line is reconstructed. At 635 the stereoscopic image pair (LE, RE) is stored. A test is performed at 640 to determine if this is the last frame line. If this is the last frame line then processing ends. If this is not the last frame then processing proceeds to 605.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for compressing a stereoscopic eye frame line image pair, said method comprising:
   accepting a first stereoscopic eye frame line image;
   accepting a second stereoscopic eye frame line image;
   determining a coarse image shift between said first stereoscopic eye frame line image and said second stereoscopic eye frame line image, wherein determination of said coarse image shift further comprises:
      determining an initial difference between said first stereoscopic eye frame line image and said second stereoscopic eye frame line image;
      determining if said initial difference is greater than a threshold, said threshold being 128 bytes;
      shifting one of said first stereoscopic eye frame line image and said second stereoscopic eye frame line image by a first number of pixels;
      shifting one of said first stereoscopic eye frame line image and said second stereoscopic eye frame line image by a second number of pixels;
      shifting one of said first stereoscopic eye frame line image and said second stereoscopic eye frame line image by a third number of pixels;
      determining a smallest difference responsive to results of said first shifting, said second shifting, said third shifting and said fourth determination; and
      storing said smallest difference;
   determining a fine image shift responsive to said coarse image shift, wherein said determination of said fine image shift further comprises:
      shifting said smallest difference right by a fourth number of pixels;
      shifting said smallest difference left by said fourth number of pixels;
      subtracting said smallest difference shifted right by said fourth number of pixels from said first stereoscopic eye frame line image;
      subtracting said smallest difference shifted left by said fourth number of pixels from said first stereoscopic eye frame line image; and
      determining a fine difference between results of said first subtraction and said second subtraction;
   forwarding one of said first stereoscopic eye frame line image and said second stereoscopic eye frame line image; and
   forwarding data corresponding to said fine image shift and metadata for further processing.

2. The method according to claim 1, further comprising:
subtracting said coarse image shift from a coarse image shift from a previous line;
determining if results of said subtraction are within the absolute value of 20%;
subtracting a coarse image shift of a current line from a coarse image shift of a previous frame responsive to said third determination; and
determining if results of said second subtraction are within the absolute value of 20%.

3. The method according to claim 1, wherein said first stereoscopic eye frame line image is a left eye image and said second stereoscopic eye frame line image is a right eye image.

4. The method according to claim 1, wherein said first stereoscopic eye frame line image is a right eye image and said second stereoscopic eye frame line image is a left eye image.

5. An apparatus for compressing a stereoscopic eye frame line image pair, comprising:
means for accepting a first stereoscopic eye frame line image;
means for accepting a second stereoscopic eye frame line image;
means for determining a coarse image shift between said first stereoscopic eye frame line image and said second stereoscopic eye frame line image, wherein means for determining said coarse image shift further comprises:
means for determining an initial difference between said first stereoscopic eye frame line image and said second stereoscopic eye frame line image;
means for determining if said initial difference is greater than a threshold, said threshold being 128 bytes;
means for shifting one of said first stereoscopic eye frame line image and said second stereoscopic eye frame line image by a first number of pixels;
means for shifting one of said first stereoscopic eye frame line image and said second stereoscopic eye frame line image by a second number of pixels;
means for shifting one of said first stereoscopic eye frame line image and said second stereoscopic eye frame line image by a third number of pixels;
means for determining a smallest difference responsive to results of said first shifting, said second shifting, said third shifting and said fourth determination; and
means for storing said smallest difference;
means for determining a fine image shift responsive to said coarse image shift, wherein said means for determining said fine image shift further comprises:
means for shifting said smallest difference left by said fourth number of pixels;
means for subtracting said smallest difference shifted right by said fourth number of pixels from said first stereoscopic eye frame line image;
means for subtracting said smallest difference shifted left by said fourth number of pixels from said first stereoscopic eye frame line image; and
means for determining a fine difference between results of said first subtraction and said second subtraction;
means for forwarding one of said first stereoscopic eye frame line image and said second stereoscopic eye frame line image; and
means for forwarding data corresponding to said fine image shift and metadata for further processing.

6. The apparatus according to claim 5, further comprising:
means for subtracting said coarse image shift from a coarse image shift from a previous line;
means for determining if results of said subtraction are within the absolute value of 20%;
means for subtracting a coarse image shift of a current line from a coarse image shift of a previous frame responsive to said third determination; and
means for determining if results of said second subtraction are within the absolute value of 20%.

7. The apparatus according to claim 5, wherein said first stereoscopic eye frame line image is a left eye image and said second stereoscopic eye frame line image is a right eye image.

8. The apparatus according to claim 5, wherein said first stereoscopic eye frame line image is a right eye image and said second stereoscopic eye frame line image is a left eye image.

9. A method for decompressing a stereoscopic eye frame line image pair, said method comprising:
receiving a transmitted first full stereoscopic eye frame line image;
extracting a difference between a first stereoscopic eye frame line image and a second stereoscopic eye frame line image;
subtracting said extracted difference from said first stereoscopic eye frame line image to determine said second eye frame line image;
storing said second stereoscopic eye frame line image;
extracting a shift line value from metadata included in said first full stereoscopic eye frame line image; and
shifting said second stereoscopic eye frame line image to its original position responsive to said shift value.

10. The method according to claim 9, further comprising storing said first stereoscopic eye frame line image and said second stereoscopic eye frame line image.

11. The method according to claim 9, wherein said first stereoscopic eye frame line image is a left eye image and said second stereoscopic eye frame line image is a right eye image.

12. The method according to claim 9, wherein said first stereoscopic eye frame line image is a right eye image and said second stereoscopic eye frame line image is a left eye image.

13. An apparatus for decompressing a stereoscopic eye frame line image pair, comprising:
means for receiving a transmitted first full stereoscopic eye frame line image;
means for extracting a difference between a first stereoscopic eye frame line image and a second stereoscopic eye frame line image;
means for subtracting said extracted difference from said first stereoscopic eye frame line image to determine said second eye frame line image;
means for storing said second stereoscopic eye frame line image;
means for extracting a shift line value from metadata included in said first full stereoscopic eye frame line image; and
means for shifting said second stereoscopic eye frame line image to its original position responsive to said shift value.

14. The apparatus according to claim 13, further comprising means for storing said first stereoscopic eye frame line image and said second stereoscopic eye frame line image.

15. The apparatus according to claim 13, wherein said first stereoscopic eye frame line image is a left eye image and said second stereoscopic eye frame line image is a right eye image.

16. The apparatus according to claim 13, wherein said first stereoscopic eye frame line image is a right eye image and said second stereoscopic eye frame line image is a left eye image.

17. An apparatus for compressing a stereoscopic eye frame line image pair, comprising:
- a first image line buffer, said first image line buffer for accepting and storing a first stereoscopic eye frame line image;
- a second image line buffer, said second image line buffer for accepting and storing a second stereoscopic eye frame line image;
- a first comparator, said first comparator for determining a coarse image shift between said first stereoscopic eye frame line image and said second stereoscopic eye frame line image;
- a differentiator, said differentiator for determining an initial difference between said first stereoscopic eye frame line image and said second stereoscopic eye frame line image, said differentiator is in communication with said first image line buffer and said second image line buffer;
- a frame line buffer, said frame line buffer for storing said initial difference, said frame line buffer in communication with said differentiator;
- said differentiator determining if said initial difference is greater than a threshold, said threshold being 128 bytes;
- an image line shifter, said image line shifter for shifting one of said first stereoscopic eye frame line image and said second stereoscopic eye frame line image by a first number of pixels, said image line shifter in communication with one of said first image line buffer and said second image line buffer;
- said image line shifter shifting one of said first stereoscopic eye frame line image and said second stereoscopic eye frame line image by a second number of pixels;
- said image line shifter shifting one of said first stereoscopic eye frame line image and said second stereoscopic eye frame line image by a third number of pixels;
- said first comparator determining a smallest difference responsive to results of said first shifting, said second shifting, said third shifting and said fourth determination, said first comparator in communication with said image line shifter and said differentiator;
- a second comparator, said second comparator for determining a fine image shift responsive to said coarse image shift, said second comparator in communication with said first comparator;
- a fine image line shifter, said fine image line shifter for shifting said smallest difference right by a fourth number of pixels, said fine image line shifter in communication with said first comparator and said second comparator;
- said fine image line shifter shifting said smallest difference left by said fourth number of pixels;
- an inter-line comparator, said inter-line comparator for subtracting said smallest difference shifted right by said fourth number of pixels from said first stereoscopic eye frame line image, said inter-line comparator in communication with said frame line buffer and said second comparator;
- said inter-line comparator subtracting said smallest difference shifted left by said fourth number of pixels from said first stereoscopic eye frame line image;
- a frame buffer and comparator, said frame buffer and comparator for determining a fine difference between results of said first subtraction and said second subtraction, said frame buffer and comparator in communication with said inter-line comparator;
- a selector, said selector for selecting one of said first stereoscopic eye frame line image and said second stereoscopic eye frame line image, said selector in communication with said inter-line comparator and said frame buffer and comparator, said selector also in communication with said second comparator;
- a delivery module, said delivery module for forwarding one of said first stereoscopic eye frame line image and said second stereoscopic eye frame line image, said delivery module in communication with said selector; and
- said delivery module forwarding data corresponding to said fine image shift and metadata for further processing.

18. The apparatus according to claim 17, further comprising:
- said first comparator subtracting said coarse image shift from a coarse image shift from a previous line;
- said first comparator determining if results of said subtraction are within the absolute value of 20%;
- said first comparator subtracting a coarse image shift of a current line from a coarse image shift of a previous frame responsive to said third determination; and
- said first comparator determining if results of said second subtraction are within the absolute value of 20%.

19. The apparatus according to claim 17, wherein said first stereoscopic eye frame line image is a left eye image and said second stereoscopic eye frame line image is a right eye image.

20. The apparatus according to claim 17, wherein said first stereoscopic eye frame line image is a right eye image and said second stereoscopic eye frame line image is a left eye image.

21. An apparatus for decompressing a stereoscopic eye frame line image pair, comprising:
- a first extractor, said extractor for receiving a transmitted first full stereoscopic eye frame line image;
- said first extractor extracting a difference between a first stereoscopic eye frame line image and a second stereoscopic eye frame line image;
- a subtractor, said subtractor for subtracting said extracted difference from said first stereoscopic eye frame line image to determine said second eye frame line image;
- a line buffer, said line buffer for storing said second stereoscopic eye frame line image;
- a second extractor, said second extractor for extracting a shift line value from metadata included in said first full stereoscopic eye frame line image; and
- a line shifter, said line shifter for shifting said second stereoscopic eye frame line image to its original position responsive to said shift value.

22. The apparatus according to claim 21, wherein said first stereoscopic eye frame line image is a left eye image and said second stereoscopic eye frame line image is a right eye image.

23. The apparatus according to claim 21, wherein said first stereoscopic eye frame line image is a right eye image and said second stereoscopic eye frame line image is a left eye image.

* * * * *